US009491099B2

United States Patent
Snyder, II et al.

(10) Patent No.: US 9,491,099 B2
(45) Date of Patent: Nov. 8, 2016

(54) LOOK-ASIDE PROCESSOR UNIT WITH INTERNAL AND EXTERNAL ACCESS FOR MULTICORE PROCESSORS

(71) Applicant: Cavium, Inc., San Jose, CA (US)

(72) Inventors: Wilson Parkhurst Snyder, II, Holliston, MA (US); Steven Craig Barner, Shrewsbury, MA (US); Richard Eugene Kessler, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 320 days.

(21) Appl. No.: 14/141,987

(22) Filed: Dec. 27, 2013

(65) Prior Publication Data

US 2015/0188816 A1    Jul. 2, 2015

(51) Int. Cl.
*H04L 12/741* (2013.01)
*G06F 12/10* (2016.01)
*G06F 11/07* (2006.01)

(52) U.S. Cl.
CPC ......... *H04L 45/745* (2013.01); *G06F 12/1027* (2013.01); *G06F 11/0793* (2013.01); *G06F 2212/68* (2013.01)

(58) Field of Classification Search
None
See application file for complete search history.

(56) References Cited

U.S. PATENT DOCUMENTS

| | | | | |
|---|---|---|---|---|
| 5,265,235 A | * | 11/1993 | Sindhu | G06F 12/0833 711/120 |
| 2001/0023466 A1 | * | 9/2001 | Farmwald | G11C 29/88 710/305 |
| 2004/0064648 A1 | * | 4/2004 | Brown | G06F 12/0862 711/137 |
| 2006/0050722 A1 | * | 3/2006 | Bury | H04L 49/9031 370/403 |
| 2014/0156949 A1 | * | 6/2014 | Chakrala | G06F 12/0891 711/144 |

* cited by examiner

*Primary Examiner* — Vincelas Louis
(74) *Attorney, Agent, or Firm* — pkalousek.ip

(57) ABSTRACT

A method and a system embodying the method for information lookup request processing at a look-aside processor unit entailing storing a received lookup transaction request in a first buffer; rebuilding the lookup transaction request into a request packet; transmitting the request packet; receiving a packet; determining whether the received packet is a response packet or an exception packet; and processing the received packet in accordance with the determining is disclosed. Furthermore, a method and a system embodying the method for exception packet processing at a look-aside processor unit entailing storing at least one received lookup transaction request in a first buffer; receiving a packet; determining that the received packet is an exception packet; and associating the exception packet with one of the at least one stored lookup transaction request in accordance with an identifier of the first buffer is disclosed.

20 Claims, 3 Drawing Sheets

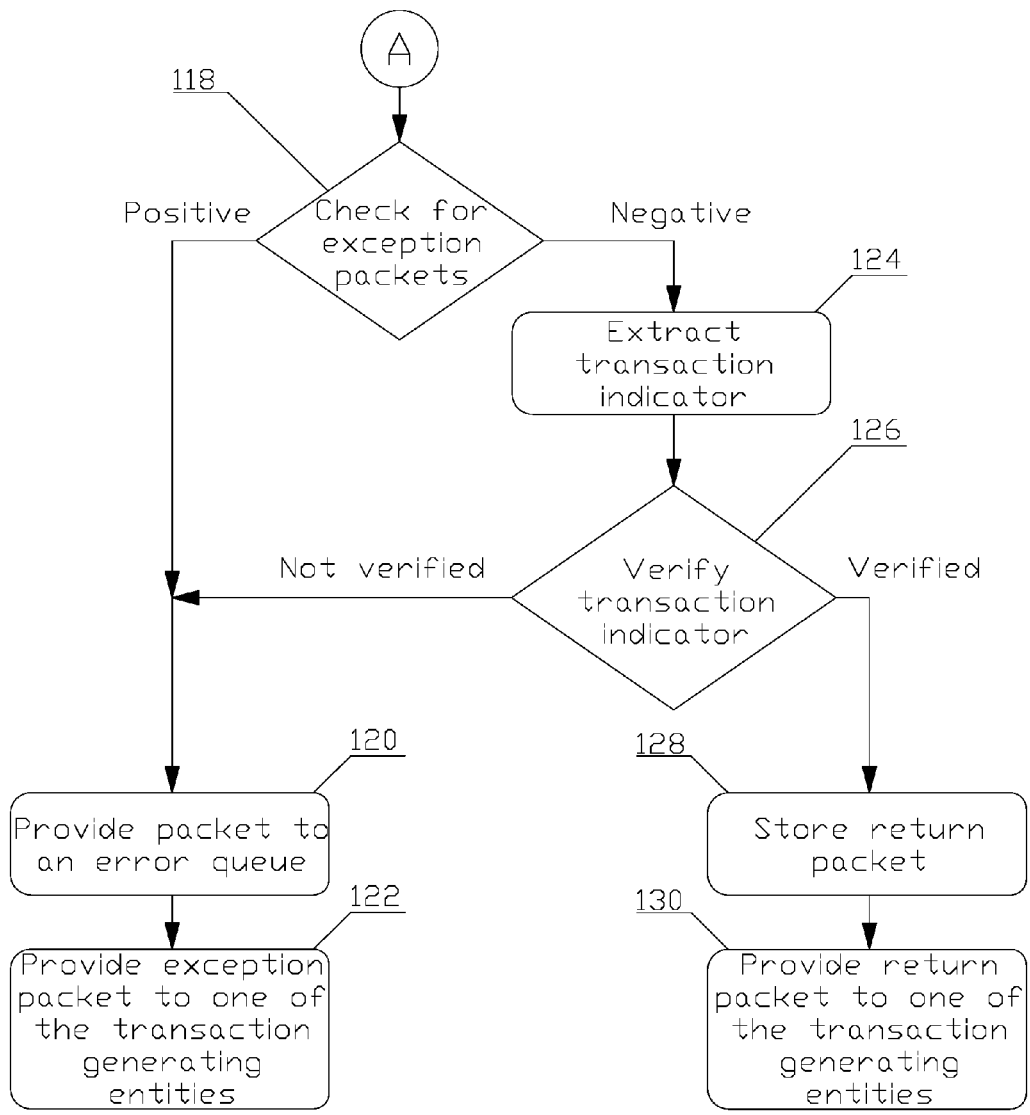
FIG. 1.b

LOOK-ASIDE PROCESSOR UNIT WITH INTERNAL AND EXTERNAL ACCESS FOR MULTICORE PROCESSORS

BACKGROUND

1. Field

The present disclosure relates to communications in computer networks. More particularly, this invention is directed toward a look-aside processor unit with internal and external access for multi-core processors.

2. Description of Related Technology

A network processor is specialized processor, often implemented in a form of an integrated circuit, with a feature set specifically designed for processing packet data received or transferred over a network. Such a processing often involves information lookup replacing expensive runtime computation with a simpler indexing operation in an information lookup table. By means of an example, routing related processing, i.e., packet forwarding, requires lookup of routing information, comprising tuples of different values that make up a Transmission Control Protocol/Internet Protocol (TCP/IP) connection, e.g., a 5-tuple comprises a source IP address, a destination IP address, a source port number, a destination port number, and a protocol in use.

As lookup is typically performed by an external ternary content-addressable memory (TCAM), perhaps connected to the network processor via Interlaken Lookaside (ILA). However a memory based lookup suffers from a latency of lookup requests. Furthermore, lookup resources, which are tracking lookups that have been submitted, are pre-allocated or dedicated to a processor core. Thus a network processor that comprises multiple cores, the dedication of resources hinders efficiency because of potentially unequal use of the dedicated resources by different processor cores.

Accordingly, there is a need in the art for a look-aside processor unit, providing a solution to the above identified problems, as well as additional advantages.

SUMMARY

In an aspect of the disclosure, an apparatus and a method for information lookup request processing and for exception packet processing at a look-aside processor unit according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein:

FIG. 1.b depicts a second part of the flow chart enabling the process of information lookup request processing and exception packet processing at the look-aside processor unit in accordance with an aspect of this disclosure.

Any unreferenced arrow or double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," an and the are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

Figure 2:
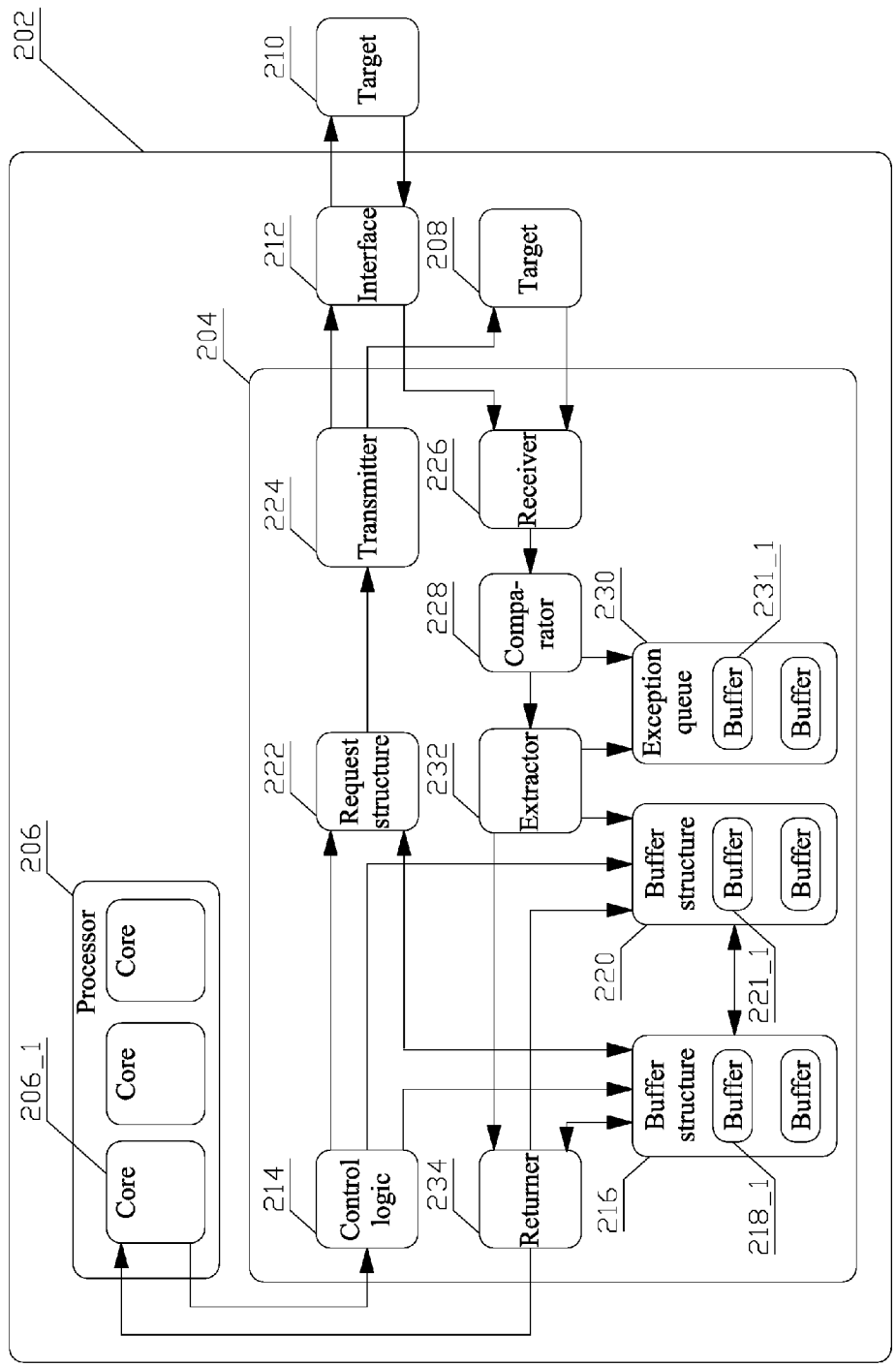
FIG. 2 depicts a conceptual structure of a look-aside processor unit, a processor, and a content-addressable memory in accordance with an aspect of this disclosure.

FIG. 2 depicts a conceptual structure of a look-aside processor unit (204), a lookup transaction requesting entity (206), and a structure (208), (210). The lookup transaction requesting entity may comprise a processor (206), an Ethernet packet input classification engine, or any other entity known to a person of ordinary skills in the art. For clarity of explanation the processor (206) is referred to throughout this disclosure as an example of such a lookup transaction requesting entity, without limiting the disclosure. The processor (206) may comprise one or a plurality of processor cores (206_1-206_3). Although only three processor cores are depicted, a person of ordinary skills in the art will understand that other number of cores, including a single core, is contemplated. The processor cores (206_1-206_3) operation requires a lookup of information stored in the structure (208), (210). To efficiently allocate resources needed for an information lookup, as well as minimize any processor cores' overhead related to the information lookup, the look-aside processor unit (204) is interposed between the processor (206) and the structure (208), (210). The different blocks may be implemented as hardware or software entities within the structure of the look-aside processor unit (204).

Figure 1A:
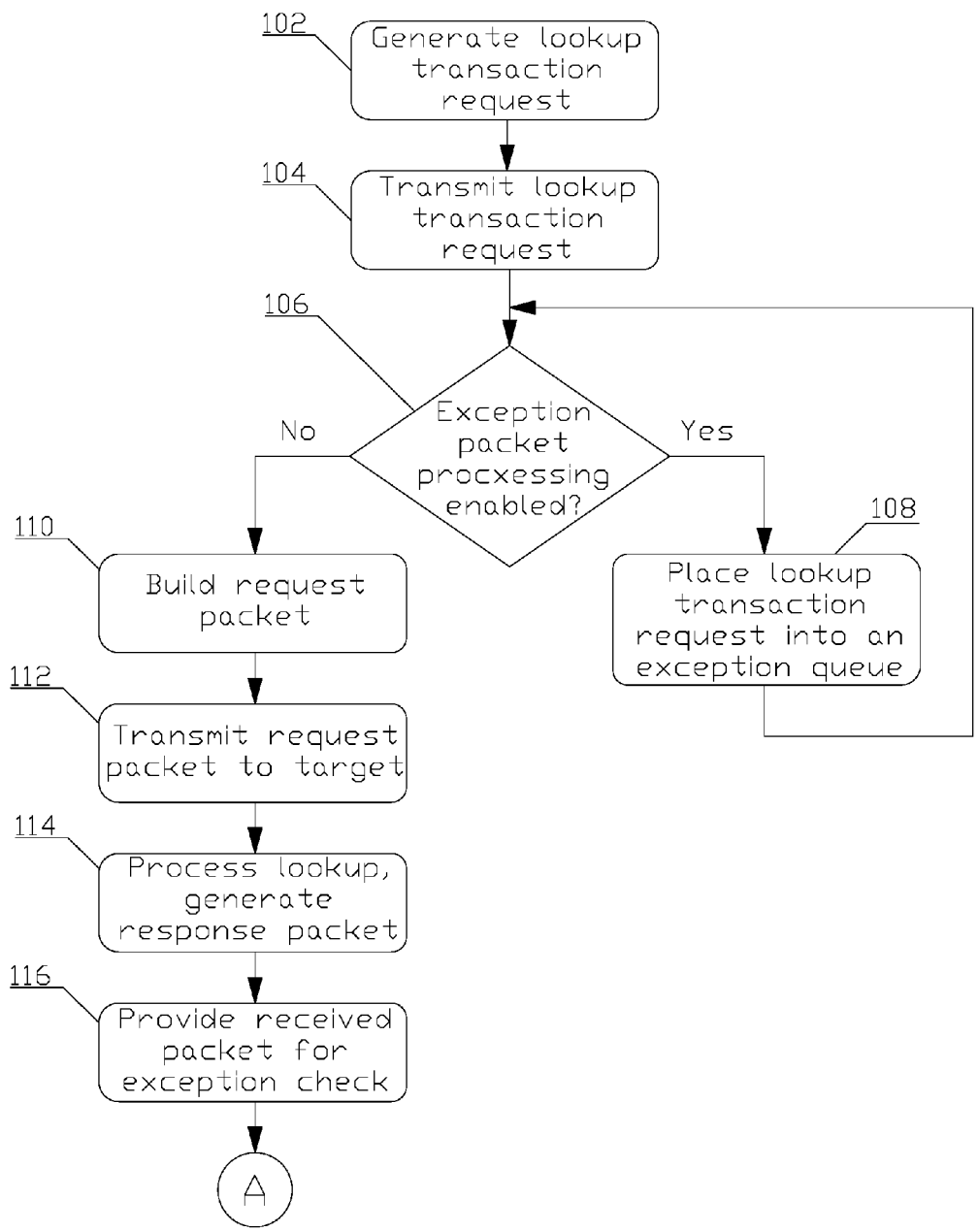
FIG. 1.a depicts a first part of a flow chart enabling a process of information lookup request processing and exception packet processing at a look-aside processor unit in accordance with an aspect of this disclosure.

FIG. 1 depicts a flow chart enabling the process for information lookup request processing and for exception packet processing at a look-aside processor unit. To further clarify the relationship between certain elements of the conceptual structure of FIG. 2 as referenced by FIG. 1 and associated text, references to structural elements of FIG. 2 are in parenthesis.

The process starts in step 102, where at least one of a plurality of processor cores of the processor (206), e.g., the processor core (206_1), generates a lookup transaction request to be transmitted to a target. The target may comprise an internal content-addressable memory, an internal lookup engine, both internal entities being collectively referenced as (208), and/or an external content-addressable memory (210), or other external component such as a field programmable gate array, and other components known to a person of ordinary skills in the art. In an aspect, the external content-addressable memory (210) comprises an external ternary content-addressable memory (TCAM), interfaced to the look-aside processor unit (204) via Interlaken Lookaside interface (212). The term external identifies a component outside of a device (202). Although as depicted, the device (202) comprises the processor (206), the look-aside processor unit (204), the Interlaken Lookaside interface (212), and the internal entities (208), other arrangements are contemplated. By means of an example, the processor (206) may be an external to the device (202). In an aspect, the device (202) is implemented as an integrated circuit. The process continues in step 104.

In step 104, the processor core (206_1) transmits the lookup transaction request to the look-aside processor unit (204). The process continues in step 106.

In step 106, the lookup transaction request is received by a control logic (214). When an optional exception packet processing is enabled, the control logic (214) determines whether a regular processing of the lookup transaction request is to be carried out, in which case the process continues in step 110, or whether the lookup transaction request is to be held for exception packets processing, in which case the process continues in step 108. The decision is made in accordance with an information provided by the processor core (206_1) that generated the lookup transaction request. The information may be provided, e.g., as an indicator in lookup transaction request, as an out-of-bound signaling, or any other method known to a person of ordinary skills in the art. Otherwise, when the optional exception packet processing is disabled, the control logic (214) receives the lookup transaction, and the process continues in step 108.

In step 108, the lookup transaction request is placed into an exception queue structure (230), comprising a plurality of buffers (231), e.g., into the buffer (231_1). A queue is an organization of data into a structure in which entities, i.e., the data comprising a packet, are kept. The process continues in step 106.

In step 110, the control logic (214) provides the lookup transaction request to a plurality of structures (216). In general, but not necessarily, one structure (216) supports one channel, i.e., a pathway through which information is transmitted to and received from the target (208), (210). In an aspect, when the Interlaken Lookaside interface is used, two structures are used, one for each of the two transmission and two reception channels supported by the Interlaken interface. For the purpose of explaining the concept without being distracted by implementation details, only a single structure is depicted. However, a person of ordinary skills in the art will understand that other number of structures (216) may be used. Each of the plurality of structures (216) comprises a plurality of look-aside buffers (218). Each of the plurality of look-aside buffers (218) may be in one of three states: FREE, i.e., the look-aside buffer is not used by any of the plurality of structures (216); PROCESSING, i.e., the content of the look-aside buffer is being processed by the target (208), (210); and RECEIVED, i.e., the content of the look-aside buffer has been transmitted to the target (208), (210), processed by the target (208), (210), and the result of the processing was returned to the look-aside buffers (218), but the result has not yet been provided to a processor core (206). Each of the plurality of structures (216) is associated with one of a plurality of structures (220), comprising a plurality of buffers (221), which holds the state of each of the plurality of the look-aside buffers (218). Thus, as depicted, the buffer (221_1) holds the state of the look-aside buffers (218_1).

Upon receiving the lookup transaction request, the control logic (214) enquires among the plurality of structures (216) for a look-aside buffer (218) in a FREE state, stores the lookup transaction request in such a look-aside buffer, e.g., the look-up buffer (218_1), and requests structure (222) to rebuild the lookup transaction request the held in the look-aside buffer (218_1) into a request packet. The rebuilding comprises addition or alteration of fields in the lookup transaction request to enable transmission of the request packet to the desired target (208), (210). In particular, alteration of the generated packet to comprises an addition of a transaction identifier. The transaction identifier comprises any identifier of the look-aside buffer (218_1) storing the request packet, e.g., a pointer, and address or any other identifier known to a person of ordinary skills in the art. The transaction identifier is needed because the look-aside processor unit (204) allows an out-of-order lookup return of the information from the target (208), (210) as disclosed infra.

In addition of comprising the request packet, each of the look-aside buffers (218_1) also comprises an error state. An error may arise when the control logic (214) rebuilds the lookup transaction request into a request packet and the enquiry does not find a look-aside buffer (218) in a FREE state. The request packet is discarded and an error interrupt is generated and provided to the processor core (206_1) that generated the lookup transaction request. In an aspect, a response is sent, indicating the error, to the requesting processor core (206_1). Another type of error may arise in case that the processor cores (206) are generating more data to be put into the request packet than the target (208), (210) can receive, causing a look-aside buffer (218) overflow. The amount of data the target (208), (210) can receive is set as a configuration parameter when the target (208), (210) is initialized. The excess data is discarded and an error indicator is generated and provided to the requesting processor core (206_1).

The process continues in step 112.

In step 112, the target (208), (210) indicates readiness to receive and process another request. In response, the control logic (214) provides the request packet, e.g., the packet stored in the look-aside buffer (218_1), to a transmitter (224) and changes the state of the corresponding buffer (221_1) of the structure (220) to PROCESSING. The transmitter transmits the request packet out of the look-aside processor unit (204) to the target (208), (210). The process continues in step 114.

In step 114, the target (208), (210) extracts the transaction identifier from the request packet, and performs the requested lookup. The target (208), (210) creates a response packet comprising the lookup information and the transaction identifier, and sends the response packet to the look-aside processor unit (204). The target (208), (210) does not need to send the response packets in the same order in which the request packets were received. Thus by means of an example, if an information lookup in response to a request packet takes more time than an information lookup in response to a later received request packet, the target (208), (210) may sent a response packet to the later received request packet before a response packet to the earlier received packet.

In addition to a response packet to a request packet, the target (208), (210) may generate an exception packet that might not be associated with a specific request packet. Such an exception packet may comprise, e.g., an interrupt packet generated due to the target's (208), (210) internal error, a request for service reporting a condition, e.g., a statistic threshold being reached, or any other indication that target (208), (210) has non-response related information to communicate with the processor core(s) known to a person of ordinary skill in the art. Such an exception packet that does not correspond to any transaction identifier may be generated by the target (208), (210), and is indicated by the target (208), (210) by setting specific bits in the response packet. Setting specific bits may include setting a single bit.

The process continues in step 116.

In step 116, the packet generated by the target (208), (210) is received by a receiver (226), which provides the received packet to block (228). The process continues in step 118.

In step 118, the block (228) examines the received packet to determine whether the received packet comprises a response packet or an exception packet.

Block (228) examines the received packet by comparing the specified bits in a received packet to a pre-determined exception mask. In an aspect, there may by a plurality of different pre-determined masks to classify the exception packets, e.g., interrupt packet, service request packets, and other type of exception packets mentioned supra. The value of each pre-determined exception mask bit is ternary, i.e., the bit value may comprise "1", "0", or "X", which stands for a "don't care". The "don't care" means that the value may represent "1" or "0". In an aspect, the pre-determined mask is implemented as two registers. A first value of a bit in the first register, e.g., value "0" is interpreted as a ternary value "X" for the comparison, regardless of the value of the second register. A second value of a bit in the first register, e.g., value "1" AND a first value of a bit in the second register, e.g., value "0" is interpreted as a ternary value "0" for the comparison. The second value of a bit in the first register, e.g., value "1" AND a second value of a bit in the second register, e.g., value "1" is interpreted as a ternary value "1" for the comparison. However, a person skilled in the art will understand the other combinations are possible.

When the specific bits in the received packet agree with the pre-determined mask, i.e., the comparison is positive, indicating an exception packet, block (228) provides the exception packet to a buffer in the exception queue (230), e.g., the buffer (231_1), and the process continues in step 120. Otherwise, when the specific bits in the received packet disagree with the pre-determined mask, i.e., the comparison is negative, indicating a response packet, the process continues in step 122.

In step 120, when the optional exception packet processing is enabled, the exception packet is associated via the identifier of the buffer (231_1) with the lookup transaction to be held for exception packets processing. In an aspect, the association is via a first-in-first-out method for organizing and manipulating a data buffer, i.e., the oldest lookup transaction to be held for exception packet processing is used. Otherwise, when the optional exception packet processing is disabled, the exception packet is processed in the same manner as the regular response packet as disclosed infra. The process continues in step 122.

In step 122, a response is generated and the exception packet held in the exception queue (230), e.g., the buffer (231_1), is provided to one of the plurality of processor cores, in accordance with the association, i.e., the exception packet is provided the processor core that generated the lookup transaction request for exception packet processing. The processor core responds in accordance with the reason for the target (208), (210) generating the exception packet e.g., interrupt, request service, as disclosed supra.

In step 124, the return packet is received in block (232). Block (232) extracts the transaction identifier from the return packet. The process continues in step 126.

In step 126, the extracted transaction identifier is compared to a state of a request packet with corresponding transaction identifier, held in the structure (220). When the state is set to PROCESSING, the process continues in step 128; otherwise the response packet is provided to an exception queue (230), and the process continues in step 124.

In step 128, the return packet is provided to block (234). Block (234) sets the state of the look-aside buffer (218_1) in the structure (220), i.e., in the corresponding buffer (221_1), to RECEIVED, stores the request packet with the return packet into one of the structures (216), and insert an indicator of the size of the return packet inside the return packet. In one aspect, block (234) replaces the request packet with the return packet in the look aside buffer, e.g., the look aside buffer (218_1). The process continues in step 130.

In step 130, the response packet is provided to one of the plurality of processor cores (206_1-206_3). In an aspect, when the processor core (206_1) provides the lookup transaction request to the look-aside processor unit (204), the processor core (206_1) simultaneously provides an address of a memory to which the returner block (234) is to write the response packet. The address may be stored in a memory designated by the look-aside processor unit (204). In one aspect, the address is stored in the structure (220). The returner block (234) writes the response packet to the provided address, e.g., using a direct memory access, and sets the state of the look-aside buffer (218_1) in the structure (220), i.e., in the corresponding buffer (221_1), to FREE.

In another aspect, the processor core (206_1) polls the state of the look-aside buffer (218_1) until the state indicates RECEIVED. In an aspect, the poll is carried out on a periodic schedule; in another aspect the processor core (206_1) polls the state when not performing a higher priority task. The processor core (206_1) then retrieves the response packet from the look-aside buffer (218_1). Block (234) detects the retrieval of the response packet and sets the state of the look-aside buffer (218_1) in the structure (220), i.e., in the corresponding buffer (221_1), to FREE.

In another aspect, the processor core (206_1) may request at some time after providing the lookup transaction request to the look-aside processor unit (204), that the returner block (234) writes the response packet to the provided address, e.g., using a direct memory access. To enable the processor core (206_1) to request correct response packet, an entity in the look-aside processor unit (204), e.g., the control logic (214), provides the processor core (206_1) with an opaque identifier. In one aspect, the identifier may comprise the address of the look-aside buffer (218_1). Once the returner block (234) writes the response packet to the provided address, the returner block (234) sets the state of the look-aside buffer (218_1) in the structure (220), i.e., in the corresponding buffer (221_1), to FREE.

In an aspect, the response packet is provided the processor core that generated the lookup transaction request. In another aspect, the response packet is provided to a different processor core from the processor core that generated the lookup transaction request. The change in processor cores may be accomplished, e.g., by the requesting core providing an identifier of the address to read the data from, or the identifier of the look-aside buffer to poll, to the processor core to receive the response packet.

The above disclosed aspect of providing the returned packet to the processor core may be combined. By means of an example, the processor core may request return packed according to the first aspect, i.e., by the processor core providing the address of a memory to which the response packet is to be written, or the third aspect, i.e., the processor core requesting the response packet at some time after providing the lookup transaction request. However, the request may time-out, i.e., the return packet is not obtained in a pre-determined amount of time. An entity in the look-aside processor unit (204) generates a response setting a bit indicating a timeout. Upon receiving the timeout response, the processor may use any of the aspects disclosed supra to request the return packet again. The advantage is reduction of resources consumption because the processor core does not need to spend time waiting for the response and instead carry out tasks with higher priority, and retrieve the response, when not attending to such higher priority tasks.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation. By means of an example, when the optional exception packet processing is disabled, the control logic (214) receives the lookup transaction and provides it directly to a plurality of structures (216), without any need for the steps 106 and 108. Additionally, the steps can be carried out in parallel or in sequence. Furthermore, the sequence of the steps may be re-arranged as long as the re-arrangement does not result in functional difference.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for information lookup request processing at a look-aside processor unit, comprising:
    storing a received lookup transaction request in a first look-aside buffer of a first storage;
    rebuilding the lookup transaction request into a request packet;
    transmitting the request packet;
    receiving a packet;
    comparing ternary values of specific bits in the received packet with ternary values of bits in a pre-determined mask;
    determining the received packet to be a response packet when the bits in the received packet disagree with the bits in the pre-determined mask; and
    determining the received packet to be an exception packet when the specific bits in the received packet agree with the bits in the pre-determined mask; and
    processing the received packet in accordance with the determining.

2. The method as claimed in claim 1, wherein the rebuilding the lookup transaction request into the request packet, comprises:
    inserting a transaction identifier comprising an identifier of the first buffer into the request packet.

3. The method as claimed in claim 1, wherein the processing the received packet in accordance with the determining, comprises:
    comparing a transaction identifier in the response packet to a state of the request packet with a corresponding transaction identifier;
    storing the response packet in a look-aside buffer of the first storage when the state comprises a first state; and
    storing the response packet in a buffer of a second storage otherwise.

4. The method as claimed in claim 3, further comprising:
    writing the stored response packet to an address in a memory provided by one of a plurality of requesting entities.

5. The method as claimed in claim 3, further comprising:
    polling the state of the request packet by one of a plurality of requesting entities; and
    requesting the response packet by the one of a plurality of requesting entities, when the state of the request packet comprises a second state.

6. The method as claimed in claim 3, further comprising:
    requesting the response packet by one of a plurality of requesting entities at a pre-determined time after the lookup transaction request was transmitted by the one of a plurality of requesting entities or by a different one of the plurality of requesting entities.

7. The method as claimed in claim 1, further comprising:
    providing the exception packet into a buffer of the second storage.

8. A method for exception packet processing at a look-aside processor unit, comprising:
    storing at least one received lookup transaction request in a first buffer of a storage;
    receiving a packet;
    comparing ternary values of specific bits in the received packet with ternary values of bits in a pre-determined mask;

determining that the received packet to be an exception packet when the specific bits in the received packet agree with the bits in the pre-determined mask; and associating the exception packet with one of the at least one stored lookup transaction request in accordance with an identifier of the first buffer.

9. The method as claimed in claim 8, wherein the associating the exception packet with one of the at least one stored lookup transaction request in accordance with the identifier of the first buffer comprises:

associating the exception packet with one of the at least one stored lookup transaction request via a first-in-first-out method for organizing and manipulating data buffer.

10. The method as claimed in claim 8, further comprising:
providing the exception packet to one of a plurality of requesting entities in accordance with the association.

11. An apparatus for information lookup request processing, comprising:
a control logic configured to store a received lookup transaction request in a first look-aside buffer of a first storage;
means for rebuilding the lookup transaction request into a request packet;
a transmitter configured to transmit the request packet;
a receiver configured to receive a packet;
a comparator configured to:
compare ternary values of specific bits in the received packet with ternary values of bits in a pre-determined mask;
determine the received packet to be a response packet when the specific bits in the received packet disagree with the bits in the pre-determined mask; and
determines the received packet to be an exception packet when the specific bits in the received packet agree with the bits in the pre-determined mask; and
means for processing the received packet in accordance with the determination.

12. The apparatus as claimed in claim 11, wherein the means for rebuilding the lookup transaction request into the request packet is configured to:
insert a transaction identifier comprising an identifier of the first buffer into the request packet.

13. The apparatus as claimed in claim 11, wherein the means for processing, comprises:
a second comparator comparing a transaction identifier in the response packet to a state of the request packet with a corresponding transaction identifier;
a first storage configured to store the response packet in a look-aside buffer when the state comprises a first state; and
a second storage configured to store the response packet in a buffer otherwise.

14. The apparatus as claimed in claim 13, wherein one of a plurality of requesting entities is configured to provide an address in a memory to which to write the stored response packet.

15. The apparatus as claimed in claim 13, wherein one of a plurality of requesting entities is configured to:
poll the state of the request packet; and
request the response packet when the state comprises a second state.

16. The apparatus as claimed in claim 13, wherein one of a plurality of requesting entities is configured to:
request the response packet at a pre-determined time after the lookup transaction request was transmitting by the one of a plurality of requesting entities or by a different one of the plurality of requesting entities.

17. The apparatus as claimed in claim 11, wherein the second storage is further configured to store the exception packet in a buffer.

18. An apparatus for exception packet processing at a look-aside processor unit, comprising:
a storage configured to store at least one received lookup transaction request in a first buffer of a storage;
a receiver configured to receive a packet;
a comparator configured to:
compare ternary values of specific bits in the received packet with ternary values of bits in a pre-determined mask; and
determine that the received packet to be an exception packet when the specific bits in the received packet agree with the bits in the pre-determined mask; and
a returner configured to associate the exception packet with one of the at least one lookup transaction request in accordance with an identifier of the first buffer.

19. The apparatus as claimed in claim 18, wherein the control logic is configured to associate the exception packet with the one of the a least one lookup transaction request via a first-in-first-out method for organizing and manipulating data buffer.

20. The apparatus as claimed in claim 18, wherein the returner is further configured to cause the storage to provide the exception packet to one of a plurality of requesting entities in accordance with the association.

* * * * *